United States Patent
Kerkman et al.

(10) Patent No.: US 6,819,070 B2
(45) Date of Patent: Nov. 16, 2004

(54) METHOD AND APPARATUS FOR CONTROLLING REFLECTED VOLTAGE USING A MOTOR CONTROLLER

(75) Inventors: Russel J. Kerkman, Milwaukee, WI (US); David Leggate, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 49 days.

(21) Appl. No.: 10/365,268

(22) Filed: Feb. 12, 2003

(65) Prior Publication Data

US 2004/0160207 A1 Aug. 19, 2004

(51) Int. Cl.$^7$ .............................................. H02M 7/521
(52) U.S. Cl. ......................... 318/434; 318/810; 318/811
(58) Field of Search ................................ 318/434, 599, 318/803, 808, 810, 811

(56) References Cited

U.S. PATENT DOCUMENTS

| | | | |
|---|---|---|---|
| 4,516,065 A | * | 5/1985 | Ninomiya et al. ........... 318/811 |
| 4,904,919 A | * | 2/1990 | McNaughton .............. 318/798 |
| 5,610,806 A | * | 3/1997 | Blasko et al. ................. 363/41 |
| 5,625,550 A | | 4/1997 | Leggate et al. |
| 5,671,130 A | | 9/1997 | Kerkman et al. |
| 5,706,186 A | | 1/1998 | Blasko |
| 5,736,825 A | | 4/1998 | Kaura et al. |
| 5,811,949 A | | 9/1998 | Garces |
| 5,912,813 A | | 6/1999 | Kerkman et al. |
| 5,990,658 A | | 11/1999 | Kerkman et al. |
| 6,014,497 A | | 1/2000 | Kerkman et al. |
| 6,023,417 A | | 2/2000 | Hava et al. |
| 6,541,933 B1 | * | 4/2003 | Leggate et al. ............. 318/599 |

* cited by examiner

*Primary Examiner*—Bentsu Ro
(74) *Attorney, Agent, or Firm*—Quarles & Brady, LLP; William R. Walburn

(57) ABSTRACT

A method and apparatus to be used with a motor controller generating firing pulses to control an inverter, the inverter providing exciting voltage to a motor corresponding to the firing pulses, the voltage having a maximum intended amplitude, the method for substantially eliminating exciting voltage overvoltage by modifying the firing pulses, the method comprising the steps of identifying characteristics of an initial firing pulse, comparing the initial pulse characteristics to an overvoltage characteristic set known to cause overvoltage, where the initial pulse characteristics match the overvoltage characteristic set, altering the initial firing pulse such that the altered firing pulse does not cause overvoltage, identifying an accumulated error corresponding to the altered firing pulse, modifying the firing pulse following the altered firing pulse as a function of the accumulated error to generate a composite firing pulse; and repeating the identifying, comparing, altering, identifying and modifying process with the composite firing pulse as the initial firing pulse.

21 Claims, 7 Drawing Sheets

METHOD AND APPARATUS FOR CONTROLLING REFLECTED VOLTAGE USING A MOTOR CONTROLLER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more particularly, to a method and an apparatus for altering stator winding voltages to eliminate greater than twice over voltage.

Many motor applications require that a motor be driven at various speeds. Motor speed can be adjusted with an Adjustable Speed Drive (ASD) which is placed between a voltage source and an associated motor that can excite the motor at various frequencies. One commonly used type of ASD uses a three-phase Pulse Width Modulated (PWM) inverter and associated PWM controller which can control both voltage and frequency of signals that eventually reach motor stator windings.

A three-phase PWM controller receives three reference or modulating signals and a triangle carrier signal, compares each modulating signal to the carrier signal and generates firing signals consisting of a plurality of pulses corresponding to each modulating signal. When a modulating signal has a greater instantaneous amplitude than the carrier signal, a corresponding firing signal is high producing a pulse on-time. When a modulating signal has an instantaneous amplitude that is less than the carrier signal, a corresponding firing signal is low producing a pulse off-time.

The firing signals are used to control the PWM inverter. A three-phase PWM inverter consists of three pairs of switches, each switch pair including series arranged upper and lower switches configured between positive and negative DC power supplies. Each pair of switches is linked to a unique motor terminal by a unique supply line, each supply line is connected to a node between an associated pair of switches. Each firing signal controls an associated switch pair to alternately connect a stator winding between the positive and negative DC power supplies to produce a series of high frequency voltage pulses that resemble the firing signals. A changing average of the high frequency voltage pulses over a period defines a fundamental low frequency alternating line-to-line voltage between motor terminals that drives the motor.

Insulated Gate Bipolar Transistors (IGBTs) are the latest power semiconductor switches used in the PWM inverter, IGBTs have fast rise times and associated switching speeds (e.g. 50–400 ns) that are at least an order of magnitude faster than BJTs and other similar devices. At IGBT switching speeds, switching frequency and efficiency, and the quality of terminal voltages, are all appreciably improved. In addition, the faster switching speeds reduce harmonic heating of the motor winding as well as reduce audible motor lamination noise.

While IGBT PWMs are advantageous for all of the reasons identified above, when combined with certain switch modulating techniques (i.e. certain on/off switching sequences), IGBT fast dv/dt or rise times can reduce the useful life of motor components and/or drive to motor voltage supply lines. In particular, while most motors and supply lines are designed to withstand operation at rated line voltages for long periods and to withstand predictable overvoltage levels for short periods, in many cases, fast switch rise times causes overvoltages that exceed design levels.

For a long time the industry has recognized and configured control systems to deal with twice overvoltage (i.e. twice the PWM inverter DC power supply level) problems. As well known in the controls art, twice overvoltage levels are caused by various combinations of line voltage rise time and magnitude, imperfect matches between line-to-line supply cable and motor surge impedances, and cable length. Line voltage frequency and switch modulating techniques have little effect on twice overvoltage levels.

There is another potentially more damaging overvoltage problem that has not been satisfactorily dealt with. The second overvoltage problem is referred to herein as greater than twice overvoltage. Unlike twice overvoltage, greater than twice overvoltage is caused by faster IGBT switching frequencies and faster IGBT dv/dt rise times interacting with two different common switch modulating techniques, that result in overvoltage problems referred to as "double pulsing" and "polarity reversal".

Each of the double pulsing and polarity reversal problems are described in detail in U.S. Pat. No. 5,912,813 (hereinafter "the '813 patent") which issued on Jun. 15, 1999, is entitled "Method and Apparatus for Controlling Reflected Voltage Using A Motor Controller". The '813 patent is incorporated herein by reference for its teachings regarding double pulsing and polarity reversal.

One way to mitigate the adverse effects of rise time induced motor overvoltages has been to design and construct relatively complex passive filter networks. Unfortunately addition of passive filter networks increases overall system design costs and implementation, requires excessive relatively expensive panel space within a system housing or cabinet and can lead to heating and other operating problems. In addition, unfortunately, passive filters limit carrier frequency selection.

One other solution to mitigate the adverse effects of rise time induced motor overvoltages has been to modify modulation and commutation software. Some of the more sophisticated techniques of this type include providing a motor controller that modifies firing pulses that are provided to an inverter in a manner calculated to eliminate greater than twice overvoltage switching sequences. When the period between two voltage changes is less than the period required for a substantially steady state voltage near zero to be reached, the period between the two voltage changes is increased. Where switching sequence results in greater than twice overvoltage due to polarity reversal, the switching sequence is altered to eliminate the possibility of greater than twice overvoltage.

Software correction solutions generally contemplates two different methods of altering the switching sequence referred to as the Maximum-Minimum Pulse Technique (MMPT) and the Pulse Elimination Technique (PET) methods. According to the MMPT method, when a PWM pulse has characteristics which could generate greater than twice overvoltage, the pulse width is altered so that its duration is set equal to or between the minimum and maximum pulse times allowed (i.e., the carrier period less a dwell time where the dwell time is the minimum period required to avoid overvoltage). Importantly, only pulses that cross the threshold level for double pulsing induced motor voltages greater than twice overvoltage and during polarity reversal periods are altered so that the resulting terminal voltage magnitude is only minimally affected.

According to the PET method, instead of only limiting pulses to within the maximum and minimum pulse times, some of the pulses having characteristics which could generate greater than twice overvoltage are eliminated. In other words, some of the positive pulse durations during positive half cycles are increased and set equal to the carrier period and some of the negative pulse durations during negative half cycles are increased and set equal to the carrier period. The result is a terminal voltage magnitude which is essentially unaffected by pulse alterations.

Unfortunately each of the MMPT and PET methods alone do alter the resulting terminal voltages. For example, when an MMPT method is employed the terminal voltage magnitude is noticeably reduced as some positive pulse durations during positive half cycles and some negative pulse durations during negative half cycles are reduced. Similarly, when a PET method is employed the terminal voltage magnitude is noticeably increased as some positive pulse durations during positive half cycles and some negative pulse durations during negative half cycles are increased.

One way to deal with errors caused by MMPT and PET methods is to provide feedback loops in the control system. For example, one control system including a feedback loop has been operated with an 18 microsecond dwell time and a carrier frequency of between 1 and 12 kHz with insignificant distortion.

In the case of relatively less expensive open loop control systems the industry has developed additional correction software designed to counter the effects of MMPT and PET methods. While this software works well, optimal correction algorithms typically require a large number of calculations and hence relatively fast processors (e.g., (microprocessor, micro-controller, or hardware programmable device)

Where cost constraints limit processor capabilities, often correction software leads to disturbances at the point at which pulse widths are altered (i.e., the "inception point") with an attendant increase in current distortion. For example, referring to FIG. 1, a U-phase to positive bus voltage signal and resulting U-phase current waveform are illustrated that were generated using a controller employing a two phase discontinuous modulating waveform at 55 Hz with a 630 V bus, a carrier frequency of 4 kHz and a dwell time of ten microseconds. FIG. 1 clearly shows that the current waveform is distorted despite the fact that the corrective code for dealing with the reflected wave phenomenon has been activated.

FIG. 2 illustrates the frequency spectra for voltage U-phase to positive bus voltage and the U-phase current. Flattening of the current peak in FIG. 1 is consistent with the current spectrum of FIG. 2 where the 5th harmonic is approximately 0.5 Arms and he 7th harmonic is approximately 0.25 Arms. The voltage spectrum in FIG. 2 includes voltage components at the 5th and 7th harmonics and a common mode component—the 2nd harmonic component illustrated.

FIG. 3 includes a current waveform $1_u$ similar to the current waveform of FIG. 1, except that the carrier frequency and dwell time used to generate the waveform of FIG. 3 where 8 kHz and 8 microseconds, respectively (the decrease in dwell time was necessary because of stability and distortion requirements). Clearly with the higher carrier frequency the current distortion is appreciably increased.

The primary cause of the increased distortion is that the dwell time percent voltage increases as carrier frequency is increased. FIG. 4 is similar to FIG. 2 except that the spectrum of FIG. 4 correspond to a U-phase to positive bus voltage signal (not illustrated) generated with a carrier frequency and a dwell time of 8 kHz and 8 micro seconds, respectively, and the U-phase current waveform of FIG. 3. Clearly the magnitudes of the distorting harmonics are increased appreciably.

Given current constraints, controller designers are confronted with selecting among different control options and accepting various tradeoffs. Among the tradeoffs are current distortion vs. execution time and voltage feedback/speed range vs. cost.

Thus, it would be advantageous to have a method and apparatus that could be used to accurately eliminate greater that twice overvoltage that can be implemented via many different types of controllers including controller that are relatively minimally computationally capable.

BRIEF SUMMARY OF THE INVENTION

It has been recognized that an accumulated error resulting from an imposed dwell time constraint from a previous PWM cycle can be added to a next pulse time to alter the next pulse time and hence substantially compensate for MMPT and PET induced distortion. This accumulation followed by error distribution is the key to a relatively simple software correction methodology that requires minimal execution time. While phase and magnitude error increases, the advantages associated with reduced execution time are appreciable and render the methodology most suitable for many control applications.

The invention includes a method to be used with a motor controller generating firing pulses to control an inverter, the inverter providing exciting voltage to a motor corresponding to the firing pulses, the voltage having a maximum intended amplitude, the method for substantially eliminating exciting voltage overvoltage by modifying the firing pulses, the method comprising the steps of (a)identifying characteristics of an initial firing pulse, (b)comparing the initial pulse characteristics to an overvoltage characteristic set known to cause overvoltage, (c)where the initial pulse characteristics match the overvoltage characteristic set, altering the initial firing pulse such that the altered firing pulse does not cause overvoltage, (d)identifying an accumulated error corresponding to the modified firing pulse, (e)modifying the firing pulse following the altered firing pulse as a function of the accumulated error to generate a composite firing pulse; and (f) repeating steps (a) through (e) with the composite firing pulse as the initial firing pulse.

In at least one embodiment the step of identifying the accumulated error includes identifying the difference between the initial firing pulse and the altered firing pulse. In some embodiments the step of modifying the firing pulse includes adding the accumulated error to the pulse following the altered firing pulse.

In some embodiments the controller includes a comparator that compares a reference signal to a carrier signal to provide the following firing pulses, one following firing pulse provided during each carrier period, each following firing pulse characterized by an on-time having a duration that is between zero and the duration of the carrier period, the step of comparing including comparing the duration to the initial firing pulse to zero, when the initial firing pulse duration is less than zero, the step of identifying an accumulated error including setting the accumulated error equal to the duration of the initial firing period and the step of altering the initial firing pulse including setting the duration of the altered firing pulse to zero.

In several embodiments the step of comparing further includes comparing the duration of the initial firing pulse to the carrier period duration, when the initial firing pulse duration is greater than the carrier period duration, the step of identifying an accumulated error including mathematically combining the initial firing pulse duration and the carrier period duration and the step of altering the initial firing pulse including setting the duration of the altered firing pulse to the carrier period duration.

The step of mathematically combining the initial firing pulse duration and the carrier period duration may include subtracting the carrier period duration from the initial firing pulse duration.

In several embodiments the overvoltage characteristic set includes a minimum pulse time corresponding to the minimum pulse durations that can occur without causing overvoltage to occur and, wherein, the step of comparing further includes, when the initial firing pulse duration is between zero and the carrier period duration, comparing the initial firing pulse duration to the minimum pulse time and, when the initial firing pulse duration is less than the minimum pulse time, the step of identifying an accumulated error including mathematically combining the initial firing pulse duration and the minimum pulse time and the step of altering the initial firing pulse including setting the duration of the altered firing pulse to the minimum pulse time. Here, the step of mathematically combining the initial firing pulse duration and the minimum pulse time may include subtracting the minimum pulse time from the initial firing pulse duration.

The overvoltage characteristic set may include a maximum pulse time corresponding to the maximum pulse durations that can occur without causing overvoltage to occur and, the step of comparing may further include, when the initial firing pulse duration is between zero and the carrier period duration, comparing the initial firing pulse duration to the maximum pulse time and, when the initial firing pulse duration is greater than the maximum pulse time, the step of identifying an accumulated error including mathematically combining the initial firing pulse duration and the maximum pulse time and the step of altering the initial firing pulse including setting the duration of the altered firing pulse to the maximum pulse time.

In one aspect the step of mathematically combining the initial firing pulse duration and the maximum pulse time includes subtracting the maximum pulse time from the initial firing pulse duration.

In some embodiments the controller includes a comparator that compares a reference signal to a carrier signal to provide the following firing pulses, each following firing pulse characterized by an on-time having a duration that is between zero and the duration of the carrier period, the overvoltage characteristic set including a minimum pulse time corresponding to the minimum pulse durations that can occur without causing overvoltage to occur and, wherein, the step of comparing includes the step of comparing the initial firing pulse duration to the minimum pulse time and, when the initial firing pulse duration is less than the minimum pulse time, the step of identifying an accumulated error including mathematically combining the initial firing pulse duration and the minimum pulse time and the step of altering the initial firing pulse including setting the duration of the altered firing pulse to the minimum pulse time.

In some embodiments the overvoltage characteristic set includes a maximum pulse time corresponding to the maximum pulse durations that can occur without causing overvoltage to occur and, wherein, the step of comparing further includes comparing the initial firing pulse duration to the maximum pulse time and, when the initial firing pulse duration is greater than the maximum pulse time, the step of identifying an accumulated error including mathematically combining the initial firing pulse duration and the maximum pulse time and the step of altering the initial firing pulse including setting the duration of the altered firing pulse to the maximum pulse time.

In several embodiments the controller includes a comparator that compares a reference signal to a carrier signal to provide the following firing pulses, each following firing pulse characterized by an on-time having a duration that is between zero and the duration of the carrier period, the overvoltage characteristic set including minimum and maximum pulse times corresponding to the minimum pulse durations and the maximum pulse durations that can occur without causing overvoltage and, wherein, the step of comparing includes comparing the initial firing pulse duration to the minimum pulse time and the maximum pulse time, when the initial firing pulse duration is less than the minimum pulse time, the step of identifying an accumulated error including setting the accumulated error equal to the initial firing pulse duration minus the minimum pulse time and the step of altering the initial firing pulse including setting the duration of the altered firing pulse to zero and, when the initial firing pulse duration is greater than the maximum pulse time, the step of identifying an accumulated error including setting the accumulated error equal to the initial firing pulse duration minus the maximum pulse time and the step of altering the initial firing pulse including setting the duration of the altered firing pulse to the carrier cycle duration.

The invention also includes a method to be used with a motor controller generating firing pulses to control an inverter, the inverter providing exciting voltage to a motor corresponding to the firing pulses, the voltage having a maximum intended amplitude, the controller including a comparator that compares a reference signal to a carrier signal to provide following firing pulses, one following firing pulse provided during each carrier period, each following firing pulse characterized by an on-time having a duration that is between zero and the duration of the carrier period, an overvoltage characteristic set including a minimum pulse time corresponding to the minimum pulse durations that can occur without causing overvoltage, the method for substantially eliminating exciting voltage overvoltage by modifying the firing pulses, the method comprising the steps of (a) identifying the duration of an initial firing pulse; (b) comparing the initial firing pulse duration to zero, (c) when the initial firing pulse duration is less than zero, setting an accumulated error equal to the duration of the initial firing period and setting the duration of an altered firing pulse to zero and skipping to step (k), (d) comparing the initial firing pulse duration to the carrier period duration, (e) when the initial firing pulse duration is greater than the carrier period duration, identifying an accumulated error by mathematically combining the initial firing pulse duration and the carrier period duration and setting the duration of an altered firing pulse to the carrier period duration and skipping to step (k), (f) comparing the initial firing pulse duration to the minimum pulse time, (g) when the initial firing pulse duration is less than the minimum pulse time, identifying an accumulated error by mathematically combining the initial firing pulse duration and the minimum pulse time and setting the duration of the altered firing pulse to the minimum pulse time and skipping to step (k), (h)comparing the initial firing pulse duration to the maximum pulse time, (i)when the initial firing pulse duration is greater than the maximum pulse time, identifying an accumulated error by mathematically combining the initial firing pulse duration and the maximum pulse time and setting the duration of the altered firing pulse to the maximum pulse time, (j)modifying the firing pulse following the altered firing pulse as a function of the accumulated error to generate a composite firing pulse and (k)repeating steps (a) through (j) with the composite firing pulse as the initial firing pulse.

Here, the step of mathematically combining the initial firing pulse duration and the carrier period duration may include subtracting the carrier period duration from the initial firing period duration, the step of mathematically combining the initial firing pulse duration and the minimum pulse time may include subtracting the minimum pulse time from the initial firing period duration and the step of mathematically combining the initial firing pulse duration and the maximum pulse time may include subtracting the maximum pulse time from the initial firing period duration.

Moreover, the invention includes an apparatus to be used with a motor controller generating firing pulses to control an inverter, the inverter providing exciting voltage to a motor corresponding to the firing pulses, the voltage having a maximum intended amplitude, the apparatus for substantially eliminating exciting voltage overvoltage by modifying the firing pulses, the apparatus comprising (a)a processor for identifying characteristics of an initial firing pulse, (b)a comparator for comparing the initial pulse characteristics to an overvoltage characteristic set known to cause overvoltage, (c)a first pulse modifier for, where the initial pulse characteristics match the overvoltage characteristic set, altering the initial firing pulse such that the altered firing pulse does not cause overvoltage and providing the altered firing pulse for inverter control, (d)an error identifier for identifying an accumulated error corresponding to the altered firing pulse and (e)a second pulse modifier for modifying the firing pulse following the altered firing pulse as a function of the accumulated error to generate a composite firing pulse, the composite firing pulse provided to the processor as the next initial firing pulse.

In some embodiments the error identifier identifies the accumulated error by subtracting the altered firing pulse duration from the initial firing pulse duration. In several embodiments the second pulse modifier modifies the firing pulse by adding the accumulated error to the pulse following the altered firing pulse.

In several embodiments the controller includes a comparator that compares a reference signal to a carrier signal to provide the following firing pulses, each following firing pulse characterized by an on-time having a duration that is between zero and the duration of the carrier period, the overvoltage characteristic set including a minimum pulse time and a maximum pulse time corresponding to the minimum and maximum pulse durations that can occur without causing overvoltage to occur and, wherein, the comparator compares the initial firing pulse duration to at least a subset of a zero value, the carrier period duration, the minimum pulse time and the maximum pulse time and when the initial pulse duration is greater than the maximum pulse time or less than the minimum pulse time, the first pulse modifier alters the initial pulse duration by subtracting one of the zero value, the carrier period duration, the minimum pulse time and the maximum pulse time from the initial pulse duration and wherein the error identifier identifies the accumulated error by, when the first pulse modifier alters the initial pulse duration by subtracting the zero value, the carrier period duration, the minimum pulse time or the maximum pulse time from the initial pulse duration, setting the accumulated error to a zero value, the carrier period duration, the minimum pulse time and the maximum pulse time, respectively.

In some embodiments when the initial pulse duration is less than zero, the first pulse modifier sets the altered pulse equal to the zero value, when the initial pulse duration is greater than the carrier period duration, the first pulse modifier sets the altered pulse equal to the carrier period duration, when the initial pulse duration is less than the minimum pulse time and greater than zero, the first pulse modifier sets the altered pulse equal to the minimum pulse time and when the initial pulse duration is greater than the maximum pulse time and less than the carrier period duration, the first pulse modifier sets the altered pulse equal to the maximum pulse time.

Furthermore, the invention includes an apparatus to be used with a motor controller generating firing pulses to control an inverter, the inverter providing exciting voltage to a motor corresponding to the firing pulses, the voltage having a maximum intended amplitude, the apparatus for substantially eliminating exciting voltage overvoltage by modifying the firing pulses, the apparatus comprising a processor running a program to perform the steps of (a)identifying characteristics of an initial firing pulse, (b)comparing the initial pulse characteristics to an overvoltage characteristic set known to cause overvoltage, (c)where the initial pulse characteristics match the overvoltage characteristic set, altering the initial firing pulse such that the altered firing pulse does not cause overvoltage, (d)identifying an accumulated error corresponding to the altered firing pulse, (e)modifying the firing pulse following the altered firing pulse as a function of the accumulated error to generate a composite firing pulse and (f)repeating steps (a) through (e) with the composite firing pulse as the initial firing pulse.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
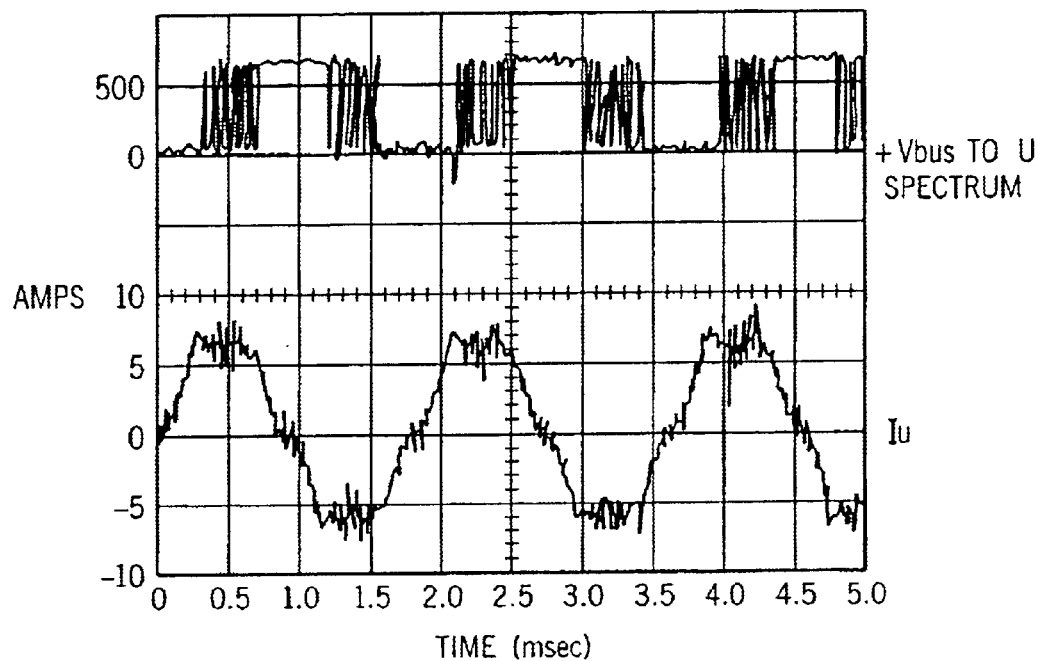
FIG. 1 is a graph illustrating a positive voltage bus to U-phase voltage and corresponding U-phase current that were generated without application of the inventive method.
Figure 2:
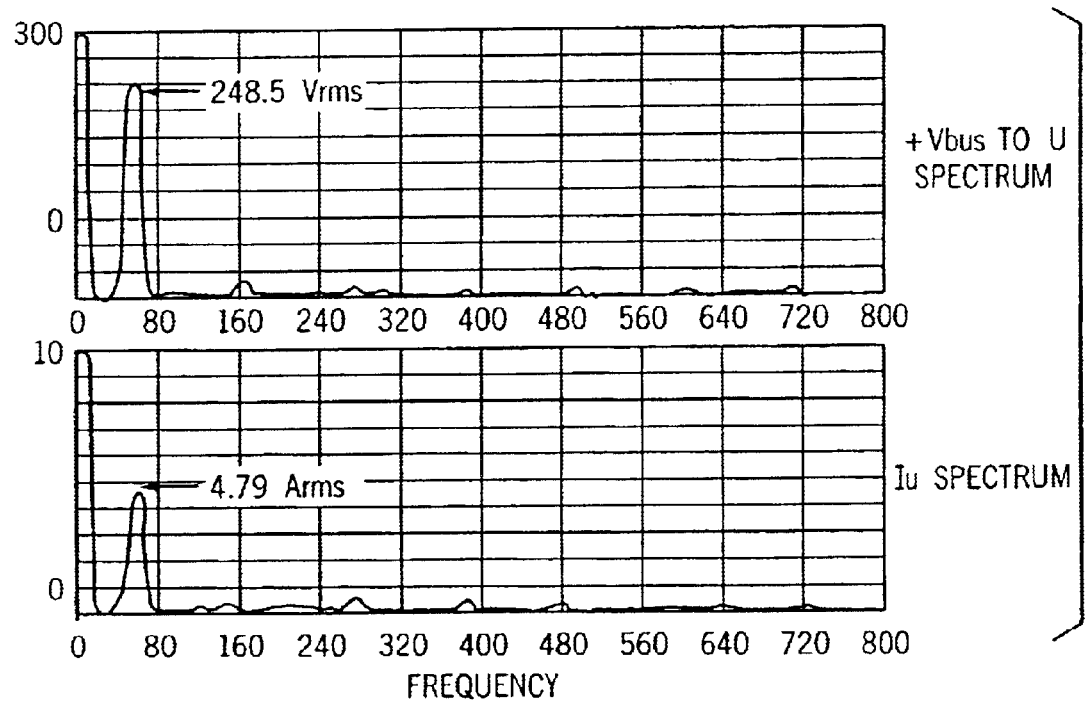
FIG. 2 includes graphs illustrating voltage and current spectrum corresponding to the waveforms of FIG. 1.

Referring now to the drawings wherein identical numbers and labels correspond to similar elements, signals and references throughout the several views and, more specifically, referring to FIG. 5, the present invention will be described in the context of an exemplary motor control system 50 including an inverter 52, a three phase motor 54, a pulse width modifier (PWM) controller 57, an overvoltage compensator 58, a comparator module 60, a modulating waveform generator 62 and a carrier signal generator 64. Inverter 52 receives positive and negative DC voltages provided on positive and negative DC buses and, as well known in the art, converts the DC voltage to three phase alternating voltage on three motor supply lines collectively identified by numeral 55. The supply lines 55, as their label implies, supply the AC voltages to separate phases of three phase motor 54.

Figure 5:
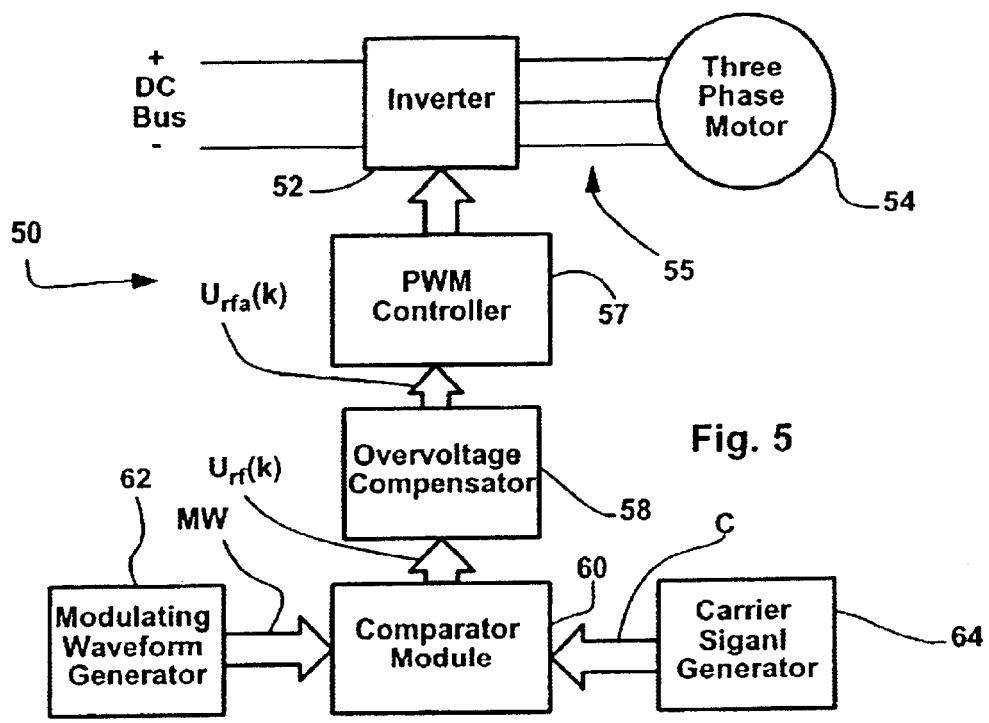
FIG. 5 is a schematic diagram illustrating an exemplary motor control system according to the present invention.
Figure 6:
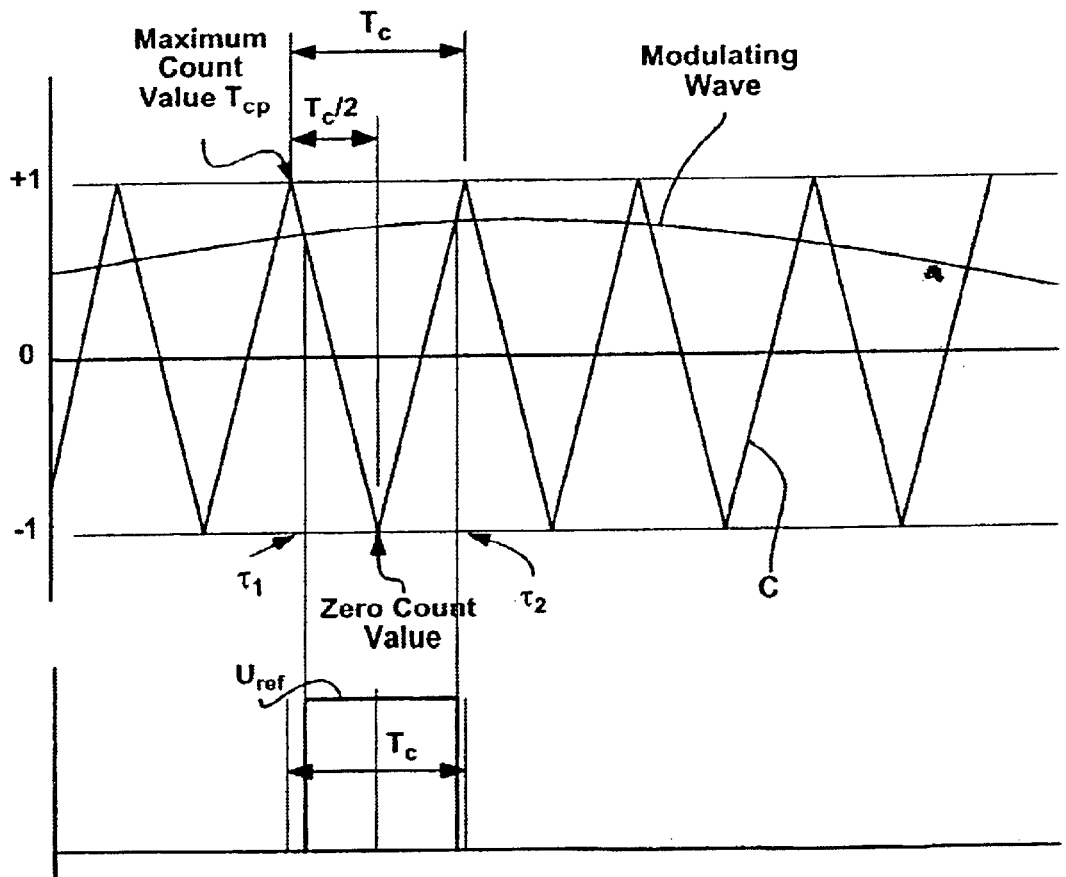
FIG. 6 is a graph illustrating an exemplary carrier signal and an exemplary modulating waveform and also illustrating an exemplary reference signal or pulse.

Referring to FIG. 5 and also to FIG. 6, carrier signal generator 64 generates a saw tooth high frequency (e.g., 4–20 kHz) carrier signal C and provides the carrier signal to comparator module 60. The carrier signal C has a period Tc from signal peak to peak and has a half cycle period Tc/2 from each peak to a consecutively following valley. In several hardware configurations, the carrier signal C actually comprises a counter value which counts from a high number value (e.g., 10,000) corresponding to a carrier signal peak to a zero value corresponding to a carrier signal valley and then back from the zero value up to the high number value at the next consecutive peak. Although other hardware configurations are contemplated, the present invention will be described in the context of the aforementioned type of configuration where the carrier signal C corresponds to a counter value between zero and the high number value.

Modulating waveform generator 62 generates three separate low frequency (e.g., 60 Hz) modulating waveforms (only one illustrated in FIG. 8) that may take any of several different forms well known in the art. For example, the modulating waveform may be a pure sinusoidal waveform, a space-vector waveform, a third-harmonic waveform, a two-phase discontinuous waveform, etc. While three modulating waveforms are generated (one for each motor phase), in the interest of simplifying this explanation only one waveform and processing associated therewith will be described here. It should suffice to say that the processing described herein is repeated for each of the three waveforms.

Waveform MW is provided to comparator module 60. In the present example, as in the case of the carrier signal C above, it will be assumed that waveform generator 62 generates a counter value corresponding to the waveform MW where the counter value changes in a fashion consistent with the type of modulating waveform. For example, where the modulating waveform is sinusoidal, the counter value changes in a sinusoidal fashion.

Referring still to FIGS. 5 and 6, comparator module 60 compares modulating waveform MW to carrier signal C and generates a trigger signal each time waveform MW and carrier signal C intersect. For example, in FIG. 6, during labeled period $T_c$, waveform MW intersects carrier signal C twice at times $\tau_1$ and $\tau_2$ and hence two trigger signals are generated during period $T_c$. Where waveform MW and carrier signal C are counter values, comparator 60 simply compares the counter values to identify intersection points. Hereinafter, when waveform MW "intersects" carrier signal C moving from below to above count C (see $\tau_1$ in FIG. 6) the corresponding trigger signal will be referred to as an "on" trigger signal. Similarly, when waveform MW intersects carrier signal C moving from above to below signal C (see $\tau_2$ in FIG. 6), the corresponding trigger signal will be referred to as an "off" trigger signal.

Referring still to FIG. 6, the two on and off trigger signals or times that occur during each carrier period $T_c$ define a reference signal or firing pulse $U_{rf}$ that begins at the on trigger time $\tau_1$, ends at the following off trigger time $\tau_2$ and remains high therebetween. Hereinafter, label $U_{rf}$ will be used to refer to the reference pulse generally and also to the on and off times that occur during a carrier cycle.

Referring still to FIG. 6, although not illustrated, it should be appreciated that in some cases waveform MW may rise above the carrier signal peak $T_{cp}$ or drop below the carrier signal valley values. When waveform MW is above the peak carrier value $T_{cp}$ during an entire carrier period $T_c$ the reference signal $U_{rf}$ remains high during the entire period $T_c$. Similarly, when waveform MW is below the valley carrier value (e.g., below count 0) during an entire carrier period $T_c$ the reference signal $U_{rf}$ remains low during the entire period $T_c$.

Comparator module 60 provides the reference signals $U_{rf}$ (and other signals corresponding to other system phases) to overvoltage compensator 58. Compensator 58 is programmed to compare reference signal $U_{rf}$ characteristics to a set of reference signal characteristics known to cause overvoltage conditions and to modify the reference signal $U_{rf}$ so that overvoltage is avoided. Thus, generally, referring again to FIG. 6, compensator 58 may or may not modify the on and off trigger times during each carrier cycle as a function of whether or not overvoltage will occur. While compensator 58 does not modify all reference signal pulses and, in fact, under certain operating conditions, does not modify any pulses, to simplify this explanation, the output of compensator 58 will be referred to as an altered reference signal $U_{rfa}$. Altered signal $U_{rfa}$ is provided to PWM controller 57.

Controller 57 uses the altered reference signals $U_{rfa}$ to generate firing pulses for inverter switches (not separately illustrated). Operation of PWM controllers 57 is well known in the art and therefore will not be explained herein detail. Here, it should suffice to say that each altered reference signal $U_{rfa}$ is used to generate firing pulses for a separate one of three different inverter legs, a separate leg corresponding to each of the three motor phases. Each leg is controlled to alternately link the positive and negative DC buses to a corresponding motor supply line 55 thereby generating a series of high frequency voltage pulses on the line. The moving average of high frequency pulses generates the AC voltage waveform required to drive motor 54. Also, controller 57 may be programmed to provide turn on delay and dead time compensation functionality, each of which is well known in the art. For a detailed description of controller and inverter operation refer to U.S. Pat. No. 5,625,550 entitled "Apparatus Used With AC Motors For Compensating For Turn On Delay Errors" which issued on Apr. 29, 1997 and which is incorporated herein by reference for its teachings regarding controller and inverter operation.

Figure 7:
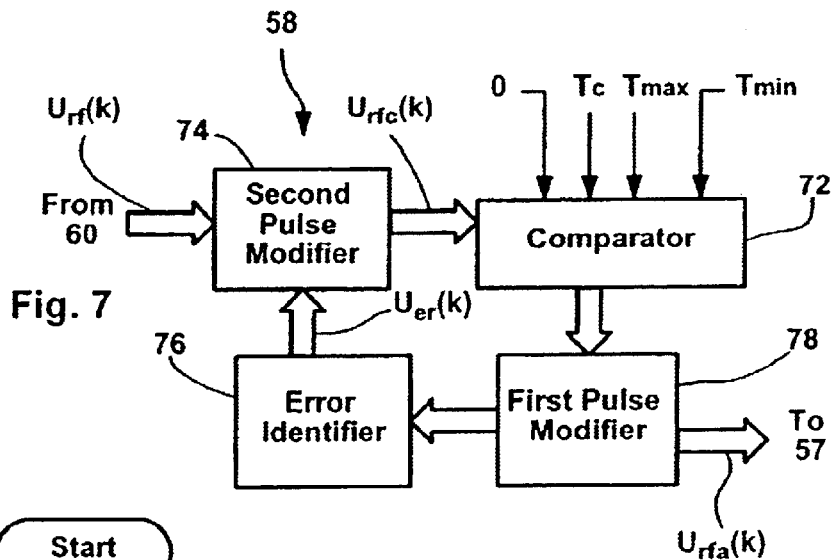
FIG. 7 is a schematic diagram illustrating various components of the overvoltage compensator of FIG. 5.

Referring now to FIG. 7, in at least one embodiment of the invention overvoltage compensator 58 includes a second pulse modifier 74, a comparator 72, a first pulse modifier 78 and an error identifier 76. Reference signal $U_{rf}$ from module 60 is received by second pulse modifier 74. In addition, an accumulated error $U_{er}$ corresponding to a previous carrier cycle is provided to pulse modifier 74 by error identifier 76.

As explained in greater detail below, accumulated error $U_{er}$ corresponds to a rolling sum of all uncompensated modifications to previous reference signals (i.e., reference signals that occurred during previous carrier cycles). For example, where a reference signal $U_{rf}$ count corresponding to an on trigger time (see $\tau_1$ in FIG. 6) is modified by reducing the count by 100 to avoid overvoltage conditions, 100 is added to (i.e., accumulated) the accumulated error $U_{er}$. Where the next trigger on time corresponding to the next carrier period is modified by reducing the count by 120 to avoid overvoltage conditions, 120 is added to the accumulated error $U_{er}$ and so on. Modifier 74 adds the accumulated error $U_{er}$ to the reference signal $U_{rf}$ thereby generating a composite reference signal $U_{rfc}$. Composite reference signal $U_{rfc}$ is provided to comparator 72.

In addition to receiving the composite reference signal $U_{rfc}$ comparator 72 is also provided with four values used to identify overvoltage conditions under which different types of reference signal modifications are needed. To this end, the four values provided to comparator 72 include a zero value, a carrier signal duration value $T_c$ a maximum pulse time value $T_{max}$, and a minimum pulse time value $T_{min}$. The maximum pulse time $T_{max}$, corresponds to the maximum pulse width for a reference signal $U_{ref}$ that can be generated without causing overvoltage conditions to occur. Similarly, the minimum pulse time value $T_{min}$ corresponds to the minimum pulse width or duration that can be generated without causing overvoltage conditions to occur. Algorithms and systems for identifying the maximum and minimum pulse time values $T_{max}$ and $T_{min}$, respectively, are well known in the art and therefore will not be described here in detail.

Comparator 72 performs several steps to determine whether or not the composite reference signal $U_{rfc}$, provided by modifier 74 will cause an overvoltage condition to occur. An exemplary algorithm performed by comparator 72 is described below with respect to FIG. 8. Pulse modifier 78 alters the composite reference signals as a function of the results of the comparisons performed by comparator 72 and then provides altered reference signals to PWM controller 57. Modifier 78 also provides an indication to error identifier 76 indicating how the composite reference signal was altered to generate the altered signal. As indicated above identifier 76 accumulates the changes or "errors" so that those changes can be subsequently compensated.

While the invention generally alters inverter firing pulses, the precise mechanism for altering those pulses is a matter of designer choice and often will be hardware dependent. For instance, consistent with the example above, where signals are represented as count values (e.g., a carrier count, a modulating wave count), etc., all comparisons will comprise comparisons of instantaneous count values, and all modifications and alterations will comprise adding or subtracting counts from other counts. For example, referring again to FIG. 6, a maximum pulse duration $T_{max}$ may be expressed as a count value between zero and the maximum carrier count value (e.g., 10,000). Similarly, a minimum pulse duration $T_{min}$ may be expressed as a count value between zero and the maximum carried count value. Hereinafter it will be assumed all values including $T_{min}$, $T_{max}$, $T_{cp}$, the carrier signal C, the reference signal $U_{rf}$, etc., are all expressed as counts.

Figure 8:
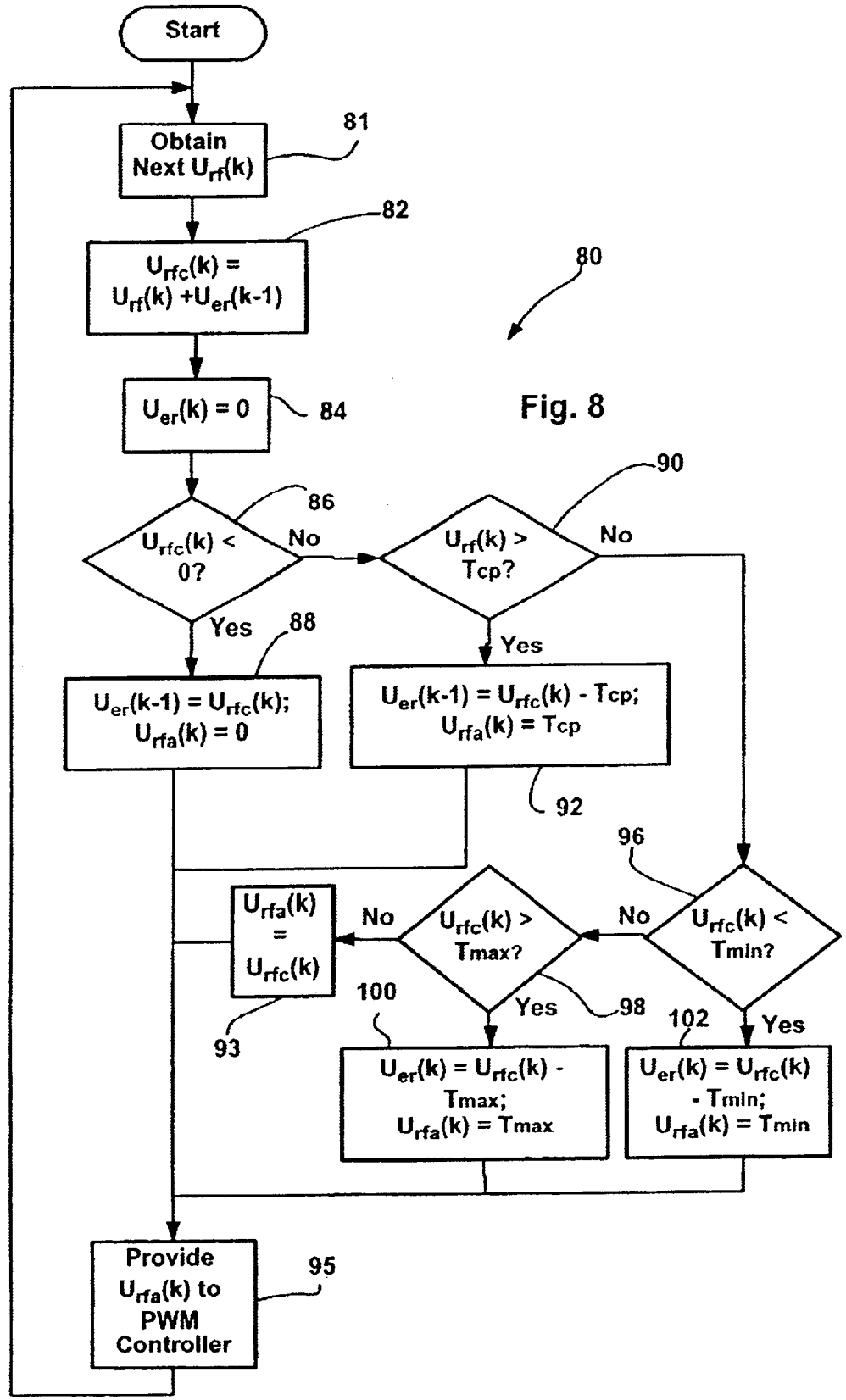
FIG. 8 is a flow chart illustrating one method according to the present invention.

Referring now to FIG. 8, an exemplary method 80 according to one embodiment of the present invention is illustrated. Referring also to FIG. 7, at block 82, second pulse modifier 74 receives the most recently generated accumulated error count $U_{er}(k-1)$ from error identifier 76 and also receives an initial reference signal count $U_{rf}(k)$ from comparator module 60 and adds the two received signals to generate a composite reference signal $U_{rfc}(k)$. At block 84 the modifier 74 sets the accumulated error count $U_{er}(k)$ equal to zero.

Continuing, at block 86, comparator 72 compares the composite signal $U_{rfc}(k)$ to zero to determine whether or not the composite signal is less than zero. Where the composite signal is less than zero, control passes to block 88 where first pulse modifier 78 sets an altered reference signal $U_{rfa}(k)$ equal to zero. In addition, at block 88, error identifier 76 identifies the difference between the composite reference signal $U_{rfc}(k)$ and the altered reference $U_{rfa}(k)$ and sets the accumulated reference error signal $U_{er}(k-1)$ equal to the difference. In this case, because the altered reference signal $U_{rfa}(k)$ is zero, the difference amounts to the composite reference signal value $U_{rfc}(k)$. After block 88 control passes to block 95 where first pulse modifier 78 provides the altered reference signal $U_{rfa}(k)$ to the PWM controller 57 (see again FIG. 5). After block 95 control passes back up to block 81 where the process is repeated with the next or following reference signal received from module 60.

Referring still to FIG. 8, if the composite reference signal $U_{rfc}(k)$ is not less than zero at block 86, control passes to block 90 where comparator 72 compares the composite reference signal $U_{rfc}(k)$ to the peak carrier signal value $T_{cp}$. Where the composite reference signal $U_{rfc}(k)$ is greater than the peak carrier signal value $T_{cp}$ control passes to block 92. At block 92, first pulse modifier 78 sets the adjusted reference signal $U_{rfa}(k)$ equal to the peak carrier signal value $T_{cp}$. In addition, at block 92, error identifier 76 determines the difference between the composite reference signal $U_{rfc}(k)$ and the peak carrier signal value $T_{cp}$ by subtracting the peak carrier signal value $T_{cp}$ from the composite signal $U_{rfc}(k)$ to identify the accumulated reference error signal $U_{er}(k-1)$. After block 92, control again passes to block 95 where the adjusted reference signal $U_{rfa}(k)$ is provided to the PWM controller. After block 95 the cycle is repeated again.

Referring once again to FIGS. 7 and 8, at block 90, if the composite reference signal $U_{rfc}(k)$ is less than the peak carrier signal value $T_{cp}$ control passes to block 96. At block 96, comparator 72 compares the composite reference signal $U_{rfc}(k)$ to the minimum pulse time $T_{min}$. Where the composite signal $U_{rfc}(k)$ is less than the minimum pulse time value $T_{min}$, control passes from block 96 to block 102. At block 102, first pulse modifier 78 sets the adjusted reference signal $U_{rfa}(k)$ equal to the minimum pulse time value $T_{min}$. In addition, at block 102, error identifier 76 sets the accumulated error signal $U_{er}(k)$ equal to the difference between the composite reference signal $U_{rfc}(k)$ and the adjusted reference signal $U_{rfa}(k)$. To this end, identifier 76 subtracts the minimum pulse time value $T_{min}$ from the composite signal $U_{rfc}(k)$ to generate the accumulated error signal $U_{er}(k)$. After block 102, control passes to block 95 and then on to block 81 where the cycle is repeated.

Referring once again to FIGS. 7 and 8, at block 96, where the composite reference signal $U_{rfc}(k)$ is greater than the minimum pulse time value $T_{min}$, control passes to block 98 where comparator 72 compares the composite reference $U_{rfc}(k)$ to the maximum pulse time $T_{max}$. If the composite reference signal $U_{rfc}(k)$ is greater than the maximum pulse time value $T_{max}$, control passes from block 98 to block 100. At block 100, first pulse modifier 78 sets the adjusted reference signal $U_{rfa}(k)$ equal to the maximum pulse time value $T_{max}$. In addition, at block 100, error identifier 76 identifies the difference between the composite reference signal $U_{rfc}(k)$ and the adjusted reference $U_{rfa}(k)$ as the accumulated error signal $U_{er}(k)$. To this end, error identifier 76 subtracts the maximum pulse value $T_{max}$, from the composite signal $U_{rfc}(k)$ to generate the accumulated error signal $U_{er}(k)$. After block 100, control again passes to block 95 and thereafter up to block 81 where the cycle is repeated.

Figure 3:
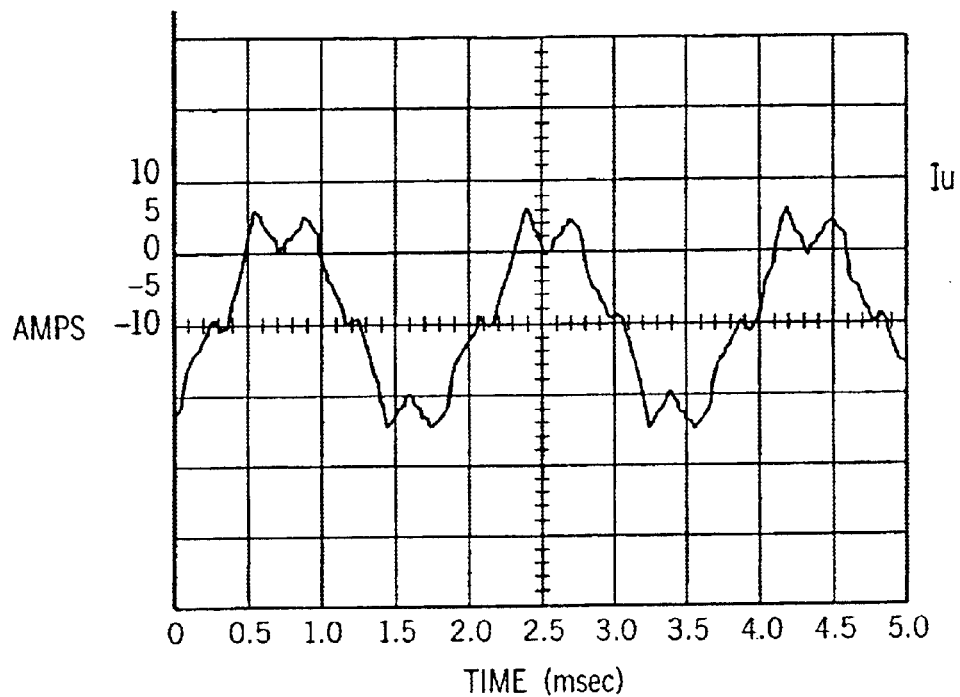
FIG. 3 illustrates a U-phase current like the current illustrated in FIG. 1, albeit generated with different operating parameters.
Figure 4:
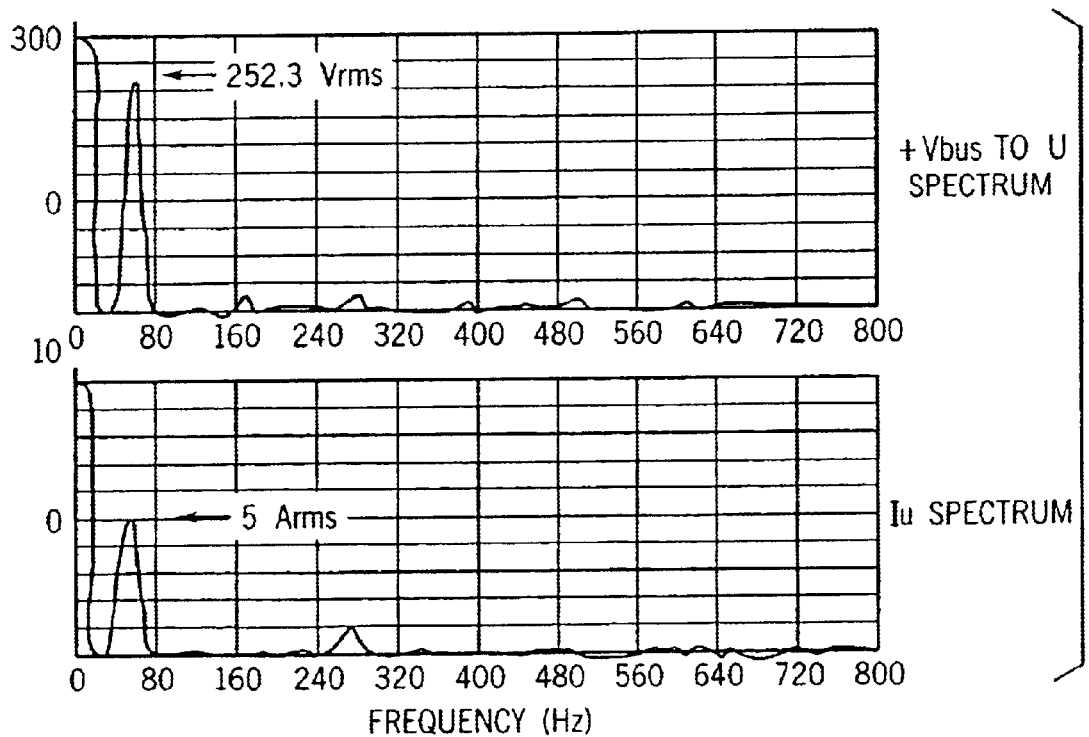
FIG. 4 is similar to FIG. 2 albeit corresponding to the current waveform of FIG. 3 and a positive voltage bus to U-phase waveform that is not illustrated.
Figure 11:
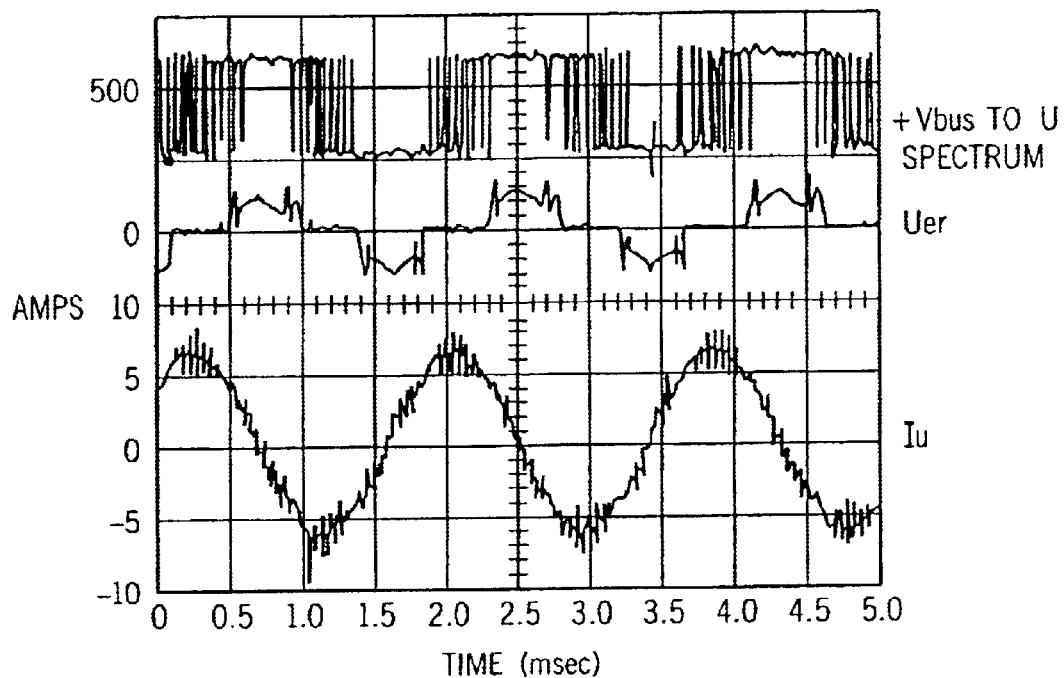
FIG. 11 is similar to FIG. 1, albeit illustrating waveforms generated using the method of FIG. 8.
Figure 12:
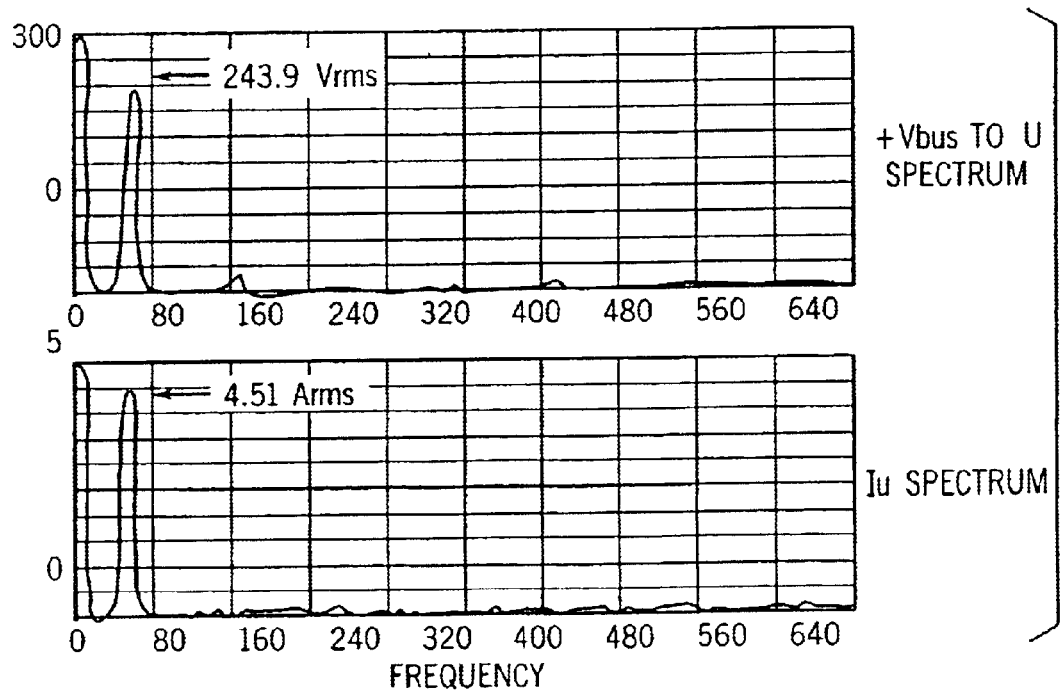
FIG. 12 is similar to FIG. 2, albeit illustrating spectrum corresponding to the waveforms of FIG. 11.

Referring again to FIGS. 7 and 8, at block 98, if the composite reference signal $U_{rfc}(k)$ is not greater than the maximum pulse time value $T_{max}$, control passes to block 93 where the adjusted reference signal $U_{rfa}(k)$ is set equal to the composite reference signal $U_{rfc}(k)$. After block 93, control passes to block 95. Referring now to FIG. 11, experimental results generated using the inventive algorithm of FIG. 8 with an IGBT inverter are illustrated. To generate the waveforms in FIG. 11, a 10 HP motor was operated at no load and at 55 Hz with a 630 v bus, a 4 kHz carrier signal and with a 16 micro-second dwell time. FIG. 12 illustrates voltage and phase currents spectrum corresponding to the waveforms in FIG. 11. Comparing FIGS. 11 and 12 to FIGS. 1 and 2 and also to FIGS. 3 and 4, it should be appreciated that the new method with extended dwell time produces a far better quality waveform than previous solutions.

It should be understood that the methods and apparatuses described above are only exemplary and do not limit the scope of the invention, and that various modifications could be made by those skilled in the art that would fall under the scope of the invention. For example, various of the process steps described with respect to FIG. 8 may be performed in different orders. For instance, decision block 86 and 90 may be swapped so that the composite reference signal $U_{rfc}(k)$ is first compared to the peak carrier signal value $T_{cp}$ and, thereafter, is compared to the zero value. Similarly, decision blocks 96 and 98 may be swapped so that the comparison process is performed in a different sequence.

Figure 9:
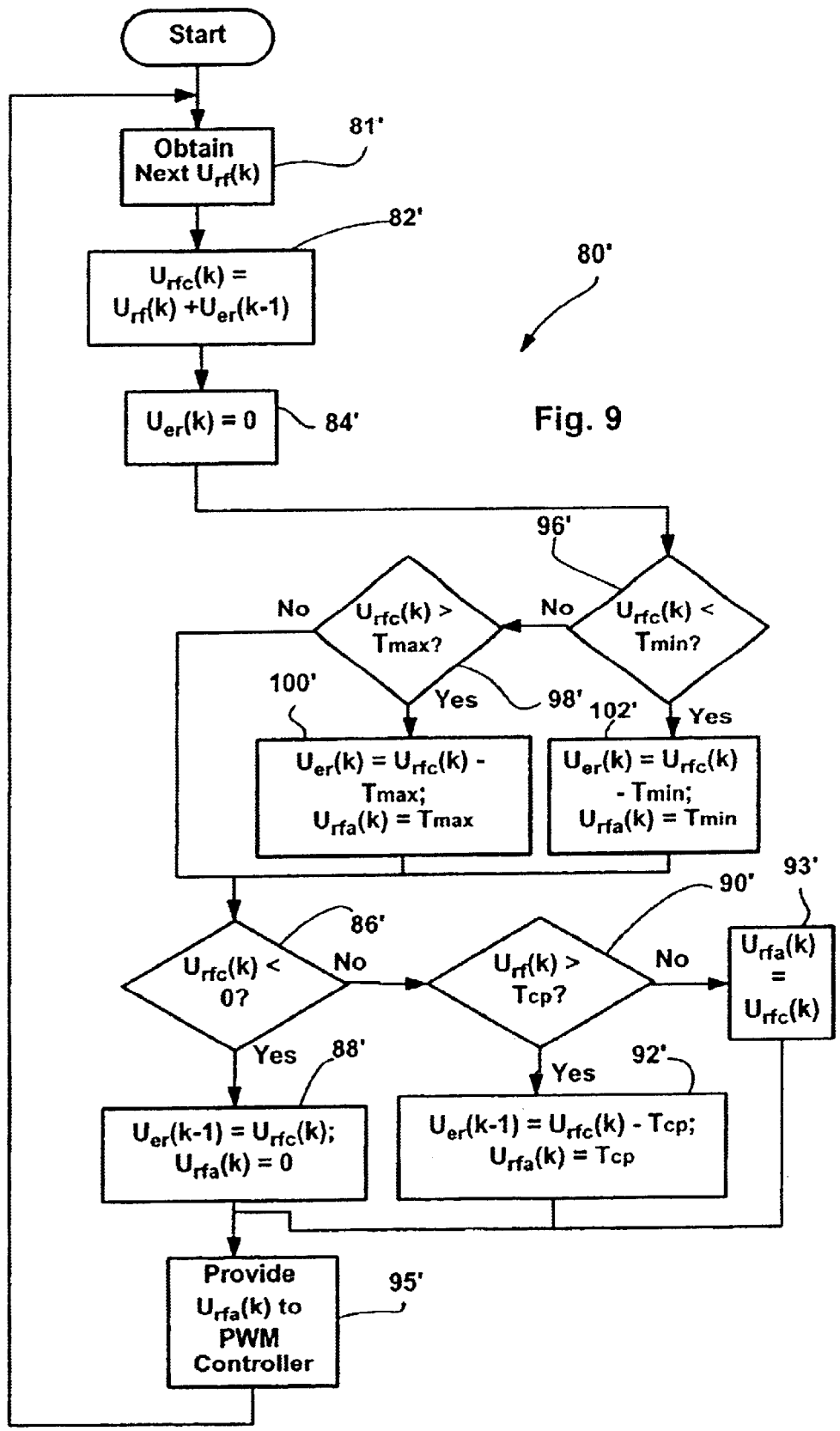
FIG. 9 is a flow chart illustrating a second method according to the present invention.

As another example, decision blocks 96 and 98 may be provided prior to decision blocks 86 and 90 in at least one other inventive algorithm. In this regard, FIG. 9 illustrates an alternate method 80' according to the present invention. In FIG. 9, decision and process blocks that are similar to the decision and process blocks illustrated in FIG. 8 are identified by similar numbers followed by a "'". The functions corresponding to blocks in FIG. 9 are essentially identical to the functions described above with respect to the similarly labeled blocks in FIG. 8, the only difference being the order in which the functions are performed. For this reason, the specific functions performed by each block in FIG. 9 will not be described again here in detail. With respect the different order, after block 84' in FIG. 9, instead of control passing to block 86', control passes to block 96' and, under certain circumstances, on to block 98' and so on. Thus, comparison of the composite reference signal $U_{rfc}(k)$ to the minimum and maximum pulse times $T_{min}$ and $T_{max}$, respectively, is performed prior to comparison of the composite reference signal $U_{rfc}(k)$ to the zero value and/or the peak carrier signal value $T_{cp}$. Importantly, while the adjusted reference signal $U_{rfa}(k)$ and the accumulated error signal $U_{er}(k)$ may be set at one of blocks 100' and 102', each one of those values may be reset at one of blocks 88' or 92' prior to providing the adjusted reference signal $U_{rfa}(k)$ to the PWM controller at block 95'.

Figure 10:
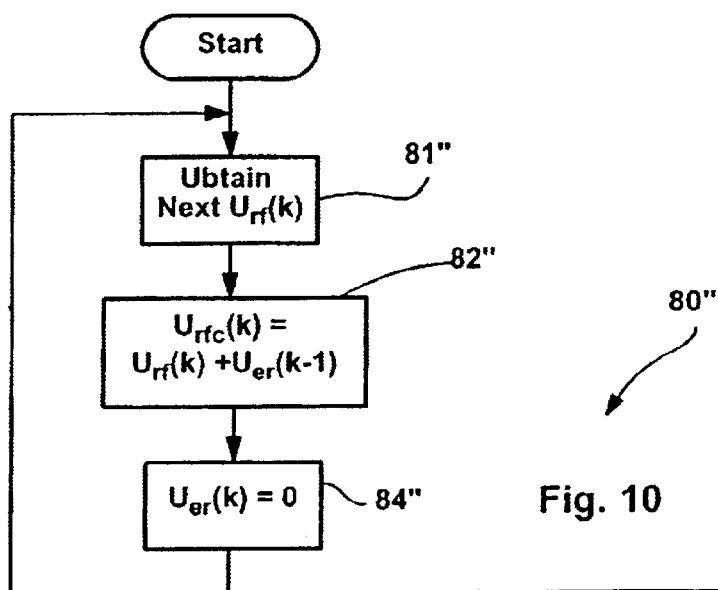
FIG. 10 is a third flow chart illustrating a simplified method according to the present invention.
Figure 10:
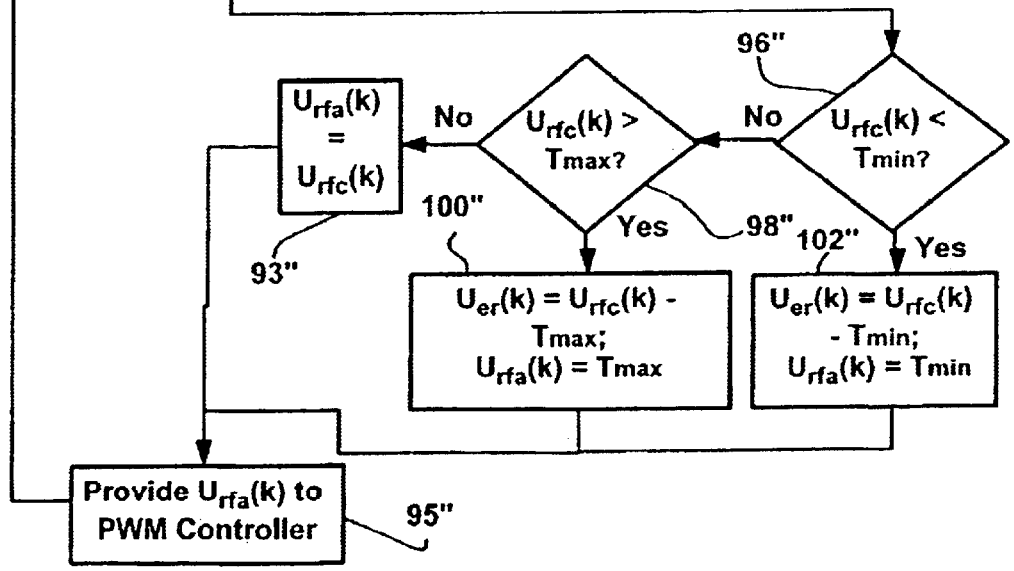

Referring to FIG. 10, yet one other simplified method 80" according to the present invention is illustrated. In FIG. 10, blocks that are similar to the block in FIG. 8 are identified by identical numbers followed a """ and, similar blocks perform similar functions. Again, in the interest of simplifying this explanation, the operation of each of the blocks in FIG. 10 will not be explained again herein detail. The process 80" is generally different than process described above with respect to FIG. 8 in that process 80" does not eliminate pulses but instead limits pulses to the maximum and minimum pulse times allowable. In this regard, process 80" does not include functions corresponding to blocks 86, 88, 90 or 92 as illustrated in FIG. 8 above. Instead, after block 84", control passes to block 96" and, under certain circumstances, on to block 98" where the composite reference signal $U_{rfc}(k)$ is compared to the minimum and maximum pulse times $T_{max}$ and $T_{min}$, respectively. Although not illustrated, one other embodiment is contemplated, wherein instead of providing altered reference signals $U_{rfa}(k)$ that are equal to the minimum and maximum pulse times, all of the altered reference signals $U_{rfa}(k)$ may be set equal to either a zero value or the peak carrier signal value $T_{cp}$. In this regard, referring once again to FIG. 8, a method of this type would include blocks 86, 88, 90 and 92 but would not include blocks 96, 98, 100 or 102.

To apprise the public of the scope of this invention, the following claims are made:

What is claimed is:

1. A method to be used with a motor controller generating firing pulses to control an inverter, the inverter providing exciting voltage to a motor corresponding to the firing pulses, the voltage having a maximum intended amplitude, the method for substantially eliminating exciting voltage overvoltage by modifying the firing pulses, the method comprising the steps of:

(a) identifying characteristics of an initial firing pulse;

(b) comparing the initial pulse characteristics to an overvoltage characteristic set known to cause overvoltage;

(c) where the initial pulse characteristics match the overvoltage characteristic set, altering the initial firing pulse such that the altered firing pulse does not cause overvoltage;

(d) identifying an accumulated error corresponding to the modified firing pulse;

(e) modifying the firing pulse following the altered firing pulse as a function of the accumulated error to generate a composite firing pulse; and (f) repeating steps (a) through (e) with the composite firing pulse as the initial firing pulse.

2. The method of claim 1 wherein the step of identifying the an accumulated error includes identifying the difference between the initial firing pulse and the altered firing pulse.

3. The method of claim 2 wherein the step of modifying the firing pulse includes adding the accumulated error to the pulse following the altered firing pulse.

4. The method of claim 3 wherein the controller includes a comparator that compares a reference signal to a carrier signal to provide the following firing pulses, one following firing pulse provided during each carrier period, each following firing pulse characterized by an on-time having a duration that is between zero and the duration of the carrier period, the step of comparing including comparing the duration to the initial firing pulse to zero, when the initial firing pulse duration is less than zero, the step of identifying an accumulated error including setting the accumulated error equal to the duration of the initial firing period and the step of altering the initial firing pulse including setting the duration of the altered firing pulse to zero.

5. The method of claim 4 wherein the step of comparing further includes comparing the duration of the initial firing pulse to the carrier period duration, when the initial firing pulse duration is greater than the carrier period duration, the step of identifying an accumulated error including mathematically combining the initial firing pulse duration and the carrier period duration and the step of altering the initial firing pulse including setting the duration of the altered firing pulse to the carrier period duration.

6. The method of claim 5 wherein the step of mathematically combining the initial firing pulse duration and the carrier period duration include subtracting the carrier period duration from the initial firing pulse duration.

7. The method of claim 6 wherein the overvoltage characteristic set includes a minimum pulse time corresponding to the minimum pulse durations that can occur without causing overvoltage to occur and, wherein, the step of comparing further includes, when the initial firing pulse duration is between zero and the carrier period duration, comparing the initial firing pulse duration to the minimum pulse time and, when the initial firing pulse duration is less than the minimum pulse time, the step of identifying an accumulated error including mathematically combining the initial firing pulse duration and the minimum pulse time and the step of altering the initial firing pulse including setting the duration of the altered firing pulse to the minimum pulse time.

8. The method of claim 7 wherein the step of mathematically combining the initial firing pulse duration and the minimum pulse time includes subtracting the minimum pulse time from the initial firing pulse duration.

9. The method of claim 7 wherein the overvoltage characteristic set includes a maximum pulse time corresponding to the maximum pulse durations that can occur without causing overvoltage to occur and, wherein, the step of comparing further includes, when the initial firing pulse duration is between zero and the carrier period duration, comparing the initial firing pulse duration to the maximum pulse time and, when the initial firing pulse duration is greater than the maximum pulse time, the step of identifying an accumulated error including mathematically combining the initial firing pulse duration and the maximum pulse time and the step of altering the initial firing pulse including setting the duration of the altered firing pulse to the maximum pulse time.

10. The method of claim 9 wherein the step of mathematically combining the initial firing pulse duration and the maximum pulse time includes subtracting the maximum pulse time from the initial firing pulse duration.

11. The method of claim 3 wherein the controller includes a comparator that compares a reference signal to a carrier signal to provide the following firing pulses, each following firing pulse characterized by an on-time having a duration that is between zero and the duration of the carrier period, the overvoltage characteristic set including a minimum pulse time corresponding to the minimum pulse durations that can occur without causing overvoltage to occur and, wherein, the step of comparing includes the step of comparing the initial firing pulse duration to the minimum pulse time and, when the initial firing pulse duration is less than the minimum pulse time, the step of identifying an accumulated error including mathematically combining the initial firing pulse duration and the minimum pulse time and the step of altering the initial firing pulse including setting the duration of the altered firing pulse to the minimum pulse time.

12. The method of claim 11 wherein the overvoltage characteristic set includes a maximum pulse time corresponding to the maximum pulse durations that can occur without causing overvoltage to occur and, wherein, the step of comparing further includes comparing the initial firing pulse duration to the maximum pulse time and, when the initial firing pulse duration is greater than the maximum pulse time, the step of identifying an accumulated error including mathematically combining the initial firing pulse duration and the maximum pulse time and the step of altering the initial firing pulse including setting the duration of the altered firing pulse to the maximum pulse time.

13. The method of claim 3 wherein the controller includes a comparator that compares a reference signal to a carrier signal to provide the following firing pulses, each following firing pulse characterized by an on-time having a duration that is between zero and the duration of the carrier period, the overvoltage characteristic set including minimum and maximum pulse times corresponding to the minimum pulse durations and the maximum pulse durations that can occur without causing overvoltage and, wherein, the step of comparing includes comparing the initial firing pulse duration to the minimum pulse time and the maximum pulse time, when the initial firing pulse duration is less than the minimum pulse time, the step of identifying an accumulated error including setting the accumulated error equal to the initial firing pulse duration minus the minimum pulse time and the step of altering the initial firing pulse including setting the duration of the altered firing pulse to zero and, when the initial firing pulse duration is greater than the maximum pulse time, the step of identifying an accumulated error including setting the accumulated error equal to the initial firing pulse duration minus the maximum pulse time and the step of altering the initial firing pulse including setting the duration of the altered firing pulse to the carrier cycle duration.

14. A method to be used with a motor controller generating firing pulses to control an inverter, the inverter providing exciting voltage to a motor corresponding to the firing pulses, the voltage having a maximum intended amplitude, the controller including a comparator that compares a reference signal to a carrier signal to provide following firing pulses, one following firing pulse provided during each carrier period, each following firing pulse characterized by an on-time having a duration that is between zero and the duration of the carrier period, an overvoltage characteristic set including a minimum pulse time corresponding to the minimum pulse durations that can occur without causing overvoltage, the method for substantially eliminating exciting voltage overvoltage by modifying the firing pulses, the method comprising the steps of:

(a) identifying the duration of an initial firing pulse;

(b) comparing the initial firing pulse duration to zero;

(c) when the initial firing pulse duration is less than zero, setting an accumulated error equal to the duration of the initial firing period and setting the duration of an altered firing pulse to zero and skipping to step (k);

(d) comparing the initial firing pulse duration to the carrier period duration;

(e) when the initial firing pulse duration is greater than the carrier period duration, identifying an accumulated error by mathematically combining the initial firing pulse duration and the carrier period duration and setting the duration of an altered firing pulse to the carrier period duration and skipping to step (k);

(f) comparing the initial firing pulse duration to the minimum pulse time;

(g) when the initial firing pulse duration is less than the minimum pulse time, identifying an accumulated error by mathematically combining the initial firing pulse duration and the minimum pulse time and setting the duration of the altered firing pulse to the minimum pulse time and skipping to step (k);

(h) comparing the initial firing pulse duration to the maximum pulse time;

(i) when the initial firing pulse duration is greater than the maximum pulse time, identifying an accumulated error by mathematically combining the initial firing pulse duration and the maximum pulse time and setting the duration of the altered firing pulse to the maximum pulse time;

(j) modifying the firing pulse following the altered firing pulse as a function of the accumulated error to generate a composite firing pulse; and (k) repeating steps (a) through (j) with the composite firing pulse as the initial firing pulse.

15. The method of claim 14 wherein the step of mathematically combining the initial firing pulse duration and the carrier period duration includes subtracting the carrier period duration from the initial firing period duration, the step of mathematically combining the initial firing pulse duration and the minimum pulse time includes subtracting the minimum pulse time from the initial firing period duration and the step of mathematically combining the initial firing pulse duration and the maximum pulse time includes subtracting the maximum pulse time from the initial firing period duration.

16. An apparatus to be used with a motor controller generating firing pulses to control an inverter, the inverter providing exciting voltage to a motor corresponding to the firing pulses, the voltage having a maximum intended amplitude, the apparatus for substantially eliminating exciting voltage overvoltage by modifying the firing pulses, the apparatus comprising:

(a) a processor for identifying characteristics of an initial firing pulse;

(b) a comparator for comparing the initial pulse characteristics to an overvoltage characteristic set known to cause overvoltage;

(c) a first pulse modifier for, where the initial pulse characteristics match the overvoltage characteristic set, altering the initial firing pulse such that the altered firing pulse does not cause overvoltage and providing the altered firing pulse for inverter control;

(d) an error identifier for identifying an accumulated error corresponding to the altered firing pulse; and (e) a second pulse modifier for modifying the firing pulse following the altered firing pulse as a function of the accumulated error to generate a composite firing pulse, the composite firing pulse provided to the processor as the next initial firing pulse.

17. The apparatus of claim 16 wherein the error identifier identifies the accumulated error by subtracting the altered firing pulse duration from the initial firing pulse duration.

18. The apparatus of claim 17 wherein the second pulse modifier modifies the firing pulse by adding the accumulated error to the pulse following the altered firing pulse.

19. The apparatus of claim 18 wherein the controller includes a comparator that compares a reference signal to a carrier signal to provide the following firing pulses, each following firing pulse characterized by an on-time having a duration that is between zero and the duration of the carrier period, the overvoltage characteristic set including a minimum pulse time and a maximum pulse time corresponding to the minimum and maximum pulse durations that can occur without causing overvoltage to occur and, wherein, the comparator compares the initial firing pulse duration to at least a subset of a zero value, the carrier period duration, the minimum pulse time and the maximum pulse time and when the initial pulse duration is greater than the maximum pulse time or less than the minimum pulse time, the first pulse modifier alters the initial pulse duration by subtracting one of the zero value, the carrier period duration, the minimum pulse time and the maximum pulse time from the initial pulse duration and wherein the error identifier identifies the accumulated error by, when the first pulse modifier alters the initial pulse duration by subtracting the zero value, the carrier period duration, the minimum pulse time or the maximum pulse time from the initial pulse duration, setting the accumulated error to a zero value, the carrier period duration, the minimum pulse time and the maximum pulse time, respectively.

20. The apparatus of claim 19 wherein, when the initial pulse duration is less than zero, the first pulse modifier sets the altered pulse equal to the zero value, when the initial pulse duration is greater than the carrier period duration, the first pulse modifier sets the altered pulse equal to the carrier period duration, when the initial pulse duration is less than the minimum pulse time and greater than zero, the first pulse modifier sets the altered pulse equal to the minimum pulse time and when the initial pulse duration is greater than the maximum pulse time and less than the carrier period duration, the first pulse modifier sets the altered pulse equal to the maximum pulse time.

21. An apparatus to be used with a motor controller generating firing pulses to control an inverter, the inverter providing exciting voltage to a motor corresponding to the firing pulses, the voltage having a maximum intended amplitude, the apparatus for substantially eliminating exciting voltage overvoltage by modifying the firing pulses, the apparatus comprising:

a processor running a program to perform the steps of:

(a) identifying characteristics of an initial firing pulse;

(b) comparing the initial pulse characteristics to an overvoltage characteristic set known to cause overvoltage;

(c) where the initial pulse characteristics match the overvoltage characteristic set, altering the initial firing pulse such that the altered firing pulse does not cause overvoltage;

(d) identifying an accumulated error corresponding to the altered firing pulse;

(e) modifying the firing pulse following the altered firing pulse as a function of the accumulated error to generate a composite firing pulse; and (f) repeating steps (a) through (e) with the composite firing pulse as the initial firing pulse.

* * * * *